(12) United States Patent
Park (10) Patent No.: US 6,394,539 B1
(45) Date of Patent: May 28, 2002

(54) VEHICLE HATCH DISMANTLING DEVICE (75) Inventor: Dae-Sung Park, Chollabuk-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/698,709

(22) Filed: Oct. 27, 2000

(30) Foreign Application Priority Data

Oct. 27, 1999 (KR) .......................................... 99-46852

(51) Int. Cl.[7] .................................................. B60J 7/19
(52) U.S. Cl. ............ 296/216.02; 296/224; 292/DIG. 5; 292/DIG. 65; 49/141; 49/394
(58) Field of Search ............ 296/216.02, 223, 296/224, 218; 49/394, 141; 292/DIG. 5, DIG. 65

(56) References Cited

U.S. PATENT DOCUMENTS

| | | | |
|---|---|---|---|
| 3,949,625 A | * | 4/1976 | Bienert ........................ 296/224 |
| 4,495,731 A | * | 1/1985 | Sears ..................... 296/218 X |
| 4,964,673 A | | 10/1990 | Lamparter .................. 296/216 |
| 5,137,327 A | * | 8/1992 | Edmonds et al. ... 296/216.02 X |

* cited by examiner

Primary Examiner—Dennis H. Pedder
(74) Attorney, Agent, or Firm—Christie, Parker & Hale, LLP (57) ABSTRACT

A vehicle hatch dismantling device adapted to firmly secure a hatch for opening and closing an opening at a vehicle roof for ventilation during normal times, and enabling the dismantling of the hatch during emergencies such as during overturn or submergence of the vehicle, while preventing breakage of the hatch even if the hatch is frequently dismantled for maintenance thereof. The device has a hatch sizeably formed to cover the vehicle roof opening, a first bracket underneath the hatch for vertically moving the hatch, a hinge link mechanism linked to the first bracket, and a second bracket fixed to an inner wall surface surrounding the opening. The device includes a lever rotably supported at one side thereof to the first bracket and has a coupling hole. The device also includes a rod coupled to the coupling hole of the lever, and an intermittent support unit coupled to the first bracket for intermittently coupling first bracket with the hatch.

5 Claims, 7 Drawing Sheets

VEHICLE HATCH DISMANTLING DEVICE

BACKGROUND OF THE INVENTION

1. Field of the Invention

The present invention relates to vehicle hatch dismantling device, and more particularly to a vehicle hatch dismantling device adapted for detachable use in emergency exit.

2. Description of the Prior Art

Figure 1:
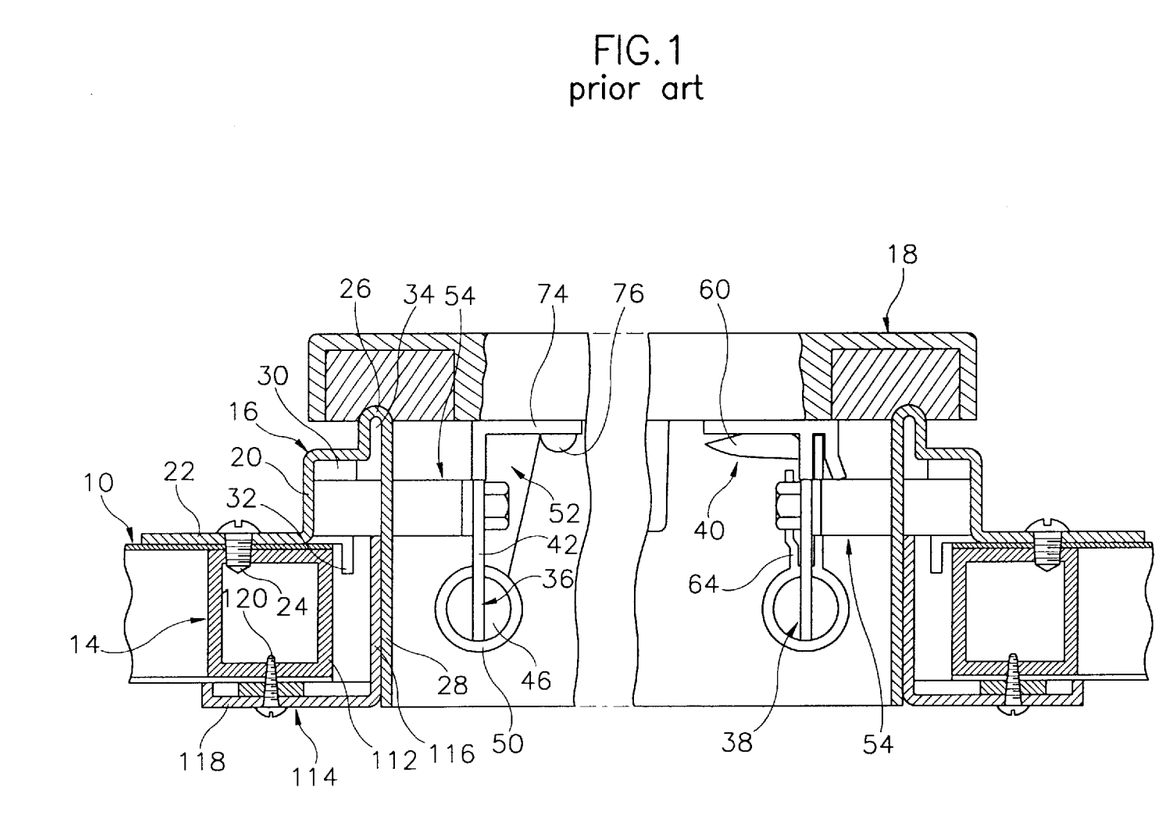
FIG. 1 is a schematic diagram for illustrating a hatch equipped with an ventilation opening at a vehicle roof according to the prior art.
Figure 2:
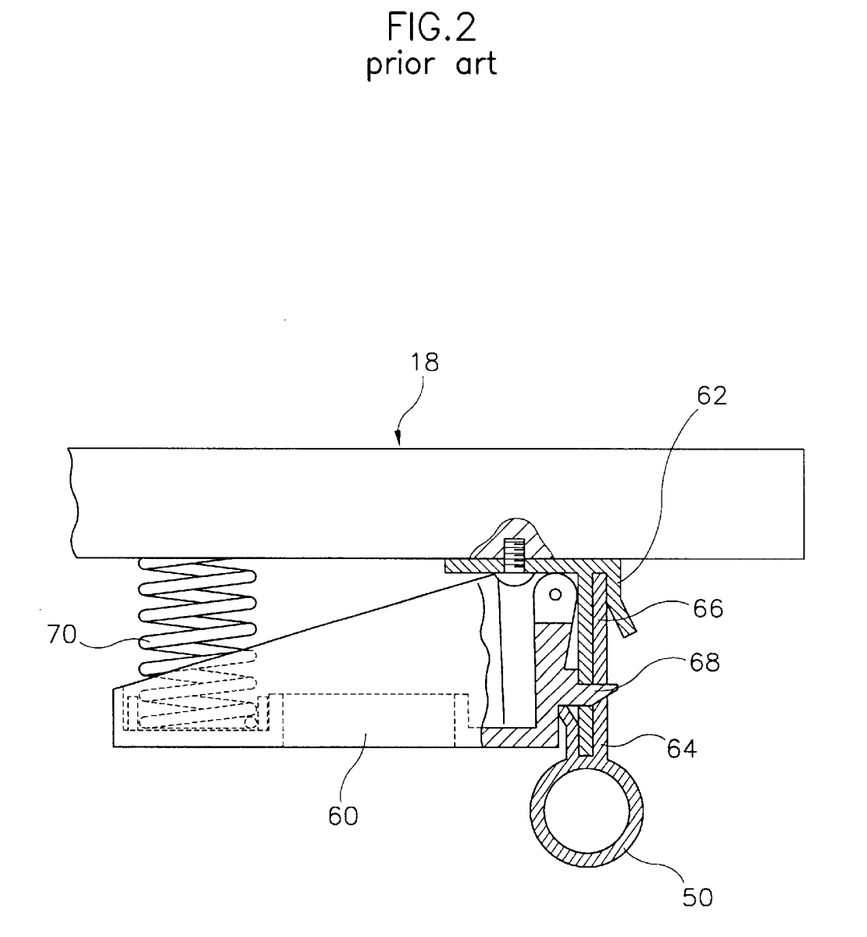
FIG. 2 is a schematic diagram for illustrating a latch mechanism of FIG. 1.
Figure 3:
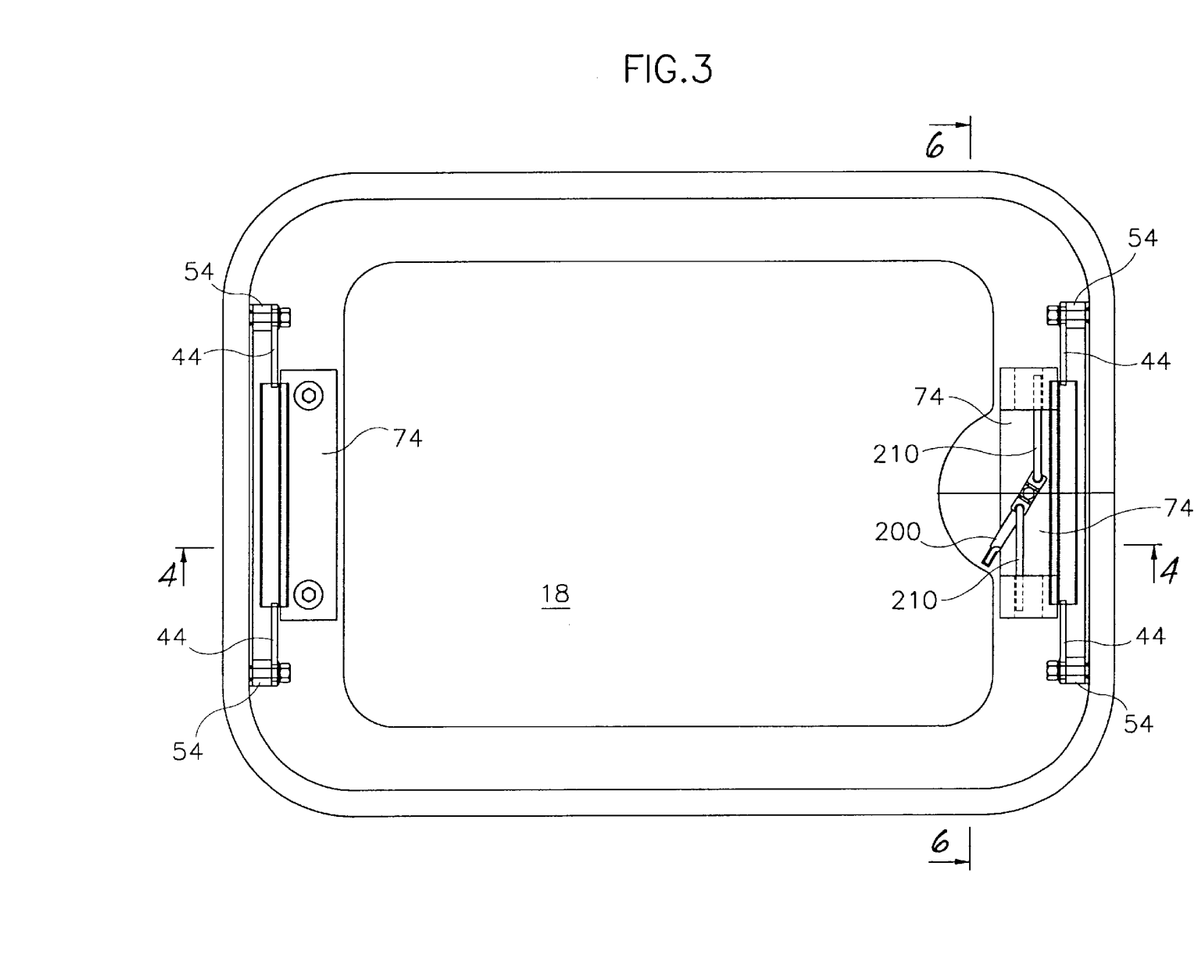
FIG. 3 is a rear view for illustrating a coupled state of a ventilation and emergency exit hatch of a vehicle according to the present invention.
Figure 4:
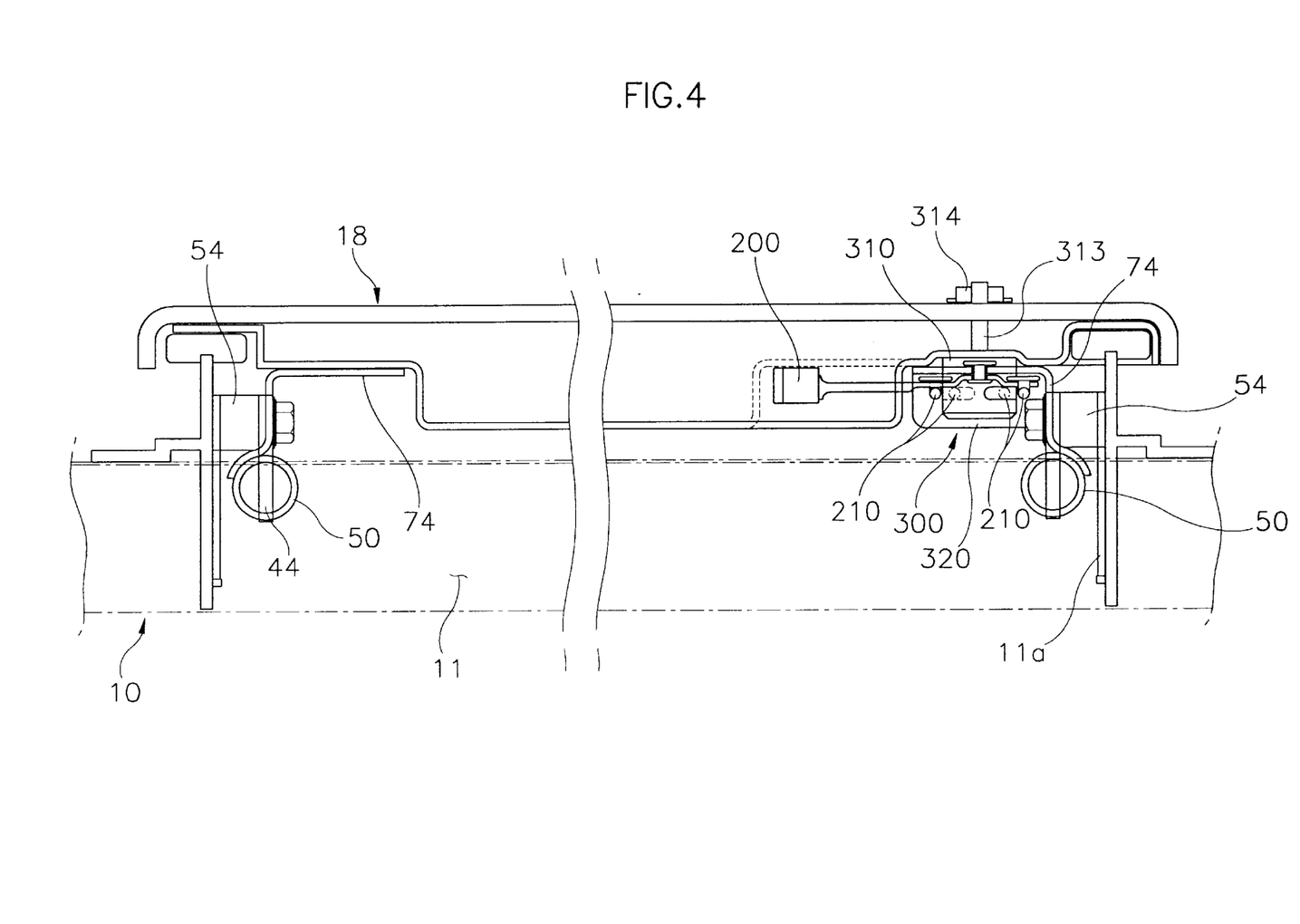
FIG. 4 is a sectional view taken along line 4—4 of FIG. 3 for illustrating a coupled state of a ventilation and emergency exit hatch of a vehicle according to the present invention.
Figure 5:
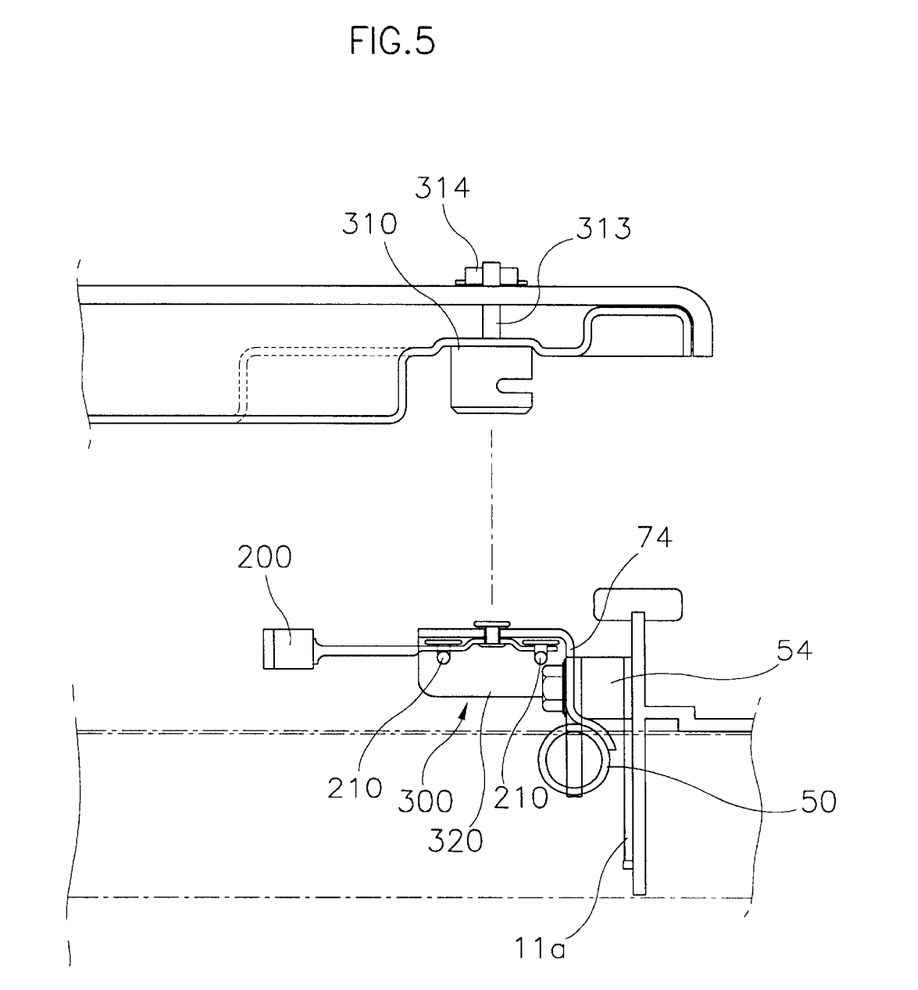
FIG. 5 is a sectional view for illustrating a released state of a ventilation and emergency exit hatch of a vehicle according to the present invention.
Figure 6:
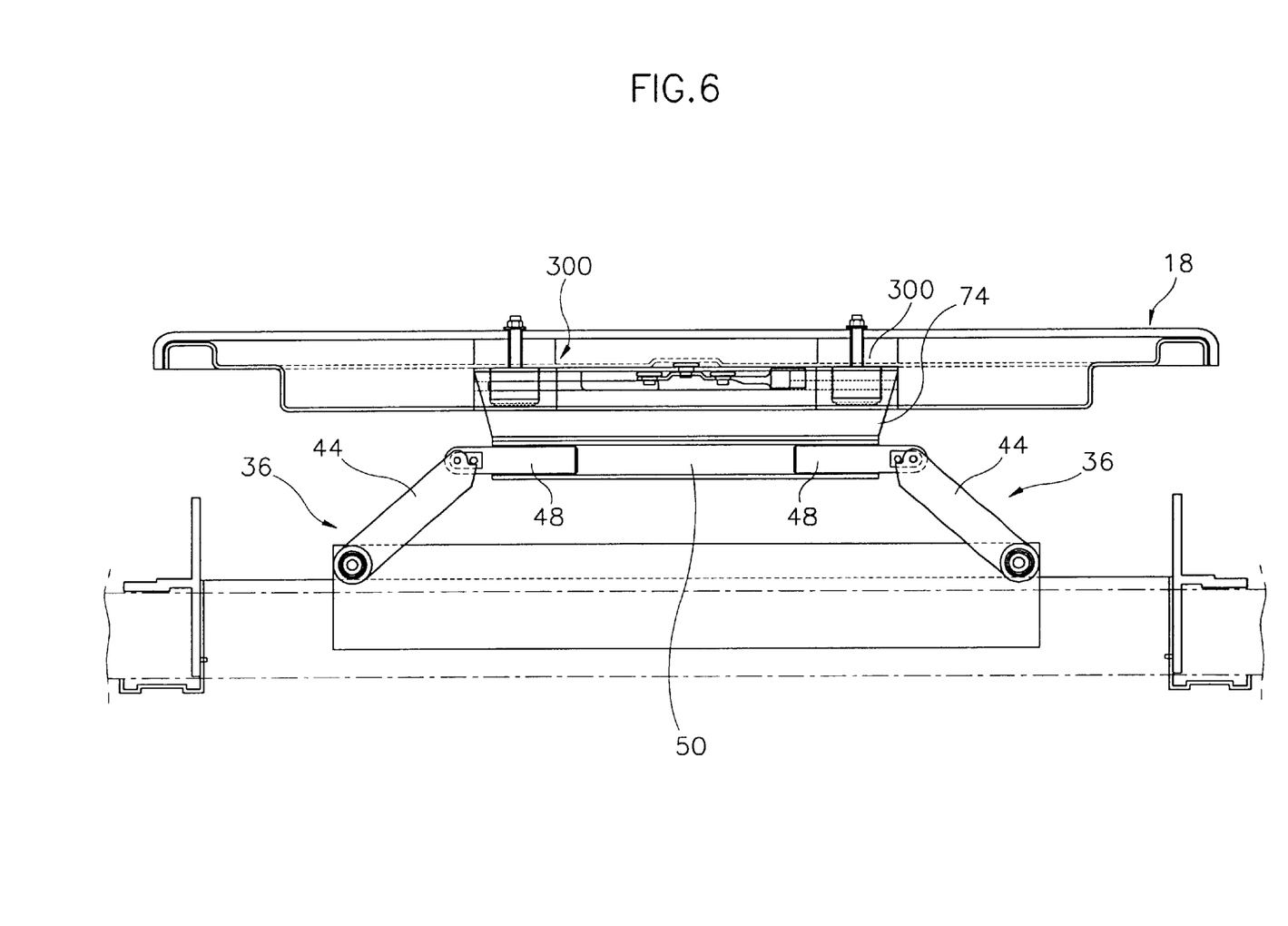
FIG. 6 is a sectional view taken along line 6—6 of FIG. 3.

In a bid to easily dismantle a hatch 18 covering an opening 11 provided on a roof of a vehicle, U.S. Pat. No. 4,964,673 disclosed an assembly for mounting a hatch operable only in one direction of the opening as shown in FIGS. 1 and 2.

The hatch 18 in U.S. Pat. No. 4,964,673 is constructed such that, when a handle 60 is rotated upward to rotably withdraw a lug 68 from a slot, a bracket slave part 66 is detached from a bracket 62, thereby enabling the hatch 18 to be separated, as illustrated in FIGS. 1 and 2.

However, there is a problem in that the lug 68 cannot obtain a turning radius, making it difficult for the lug 68 to be easily withdrawn from the slot. There is another problem in that the lug may broke when the lug is withdrawn by the necessity of detaching the hatch 18 for maintenance of the hatch 18.

SUMMARY OF THE INVENTION

The present invention is disclosed to solve the aforementioned problems and it is an object of the present invention to provide a vehicle hatch dismantling device adapted to firmly secure a hatch in order to open and close an opening at a vehicle roof for ventilation during normal times, and to easily enable to dismantle a hatch during emergency such as overturn or submergence of a vehicle. It is another object of the present invention to provide a vehicle hatch dismantling device adapted to prevent breakage of hatch even if the hatch is frequently dismantled for maintenance thereof.

In accordance with objects of the present invention, there is provided vehicle hatch dismantling device, the device having a hatch sizeably formed to cover an opening at a roof, a first bracket secured underneath the hatch for vertically moving the hatch, and a hinge link mechanism linked to the first bracket and a second bracket fixed to an inner wall surface of the opening, the device comprising:

a lever rotably supported at one side thereof to a center part of the first bracket and having coupling holes detachedly formed from a support point thereof each at a predetermined distance;

a plurality of rods each cooperating with hinged rotation of the lever and each movable coupled to the coupling hole of the lever in an opposite direction from the coupling hole; and intermittent support means secured at both sides of bracket for being hitchingly coupled according to movement of the rod to intermittently support the first bracket and the hatch, wherein the intermittent support means further comprises:

a stopper coupled to the hatch and formed with a hitching hole at an approximate center portion thereof; and a support member coupled to the first bracket and longitudinally formed with a fitting hole where the stopper is fitted and crosswise formed with a support hole through which a rod passes, wherein the support member is formed with a guide member openly formed at one side thereof with a guide hole for the rod to be guidingly moved therethrough.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiment of the present invention will now be described in detail with reference to the accompanying drawings.

A hatch 18 covering an opening 11 provided at a vehicle roof 10 for ventilation and emergency exit is hinged to an inner wall of the opening 11 by way of a hinge link mechanism 36.

The hinge link mechanism 36 is respectively connected to a first bracket 74 and a second bracket 11a and comprises a flange 48 connected to a tubular part 50 of the first bracket 74 and a bar 44 hinged to a space between the flange 48 and a lever support element 54. The first bracket 74 is mounted underneath the hatch 18 for vertically moving the hatch 18 and the second bracket 11a is fixed to the inner wall of the opening 11.

Figure 7:
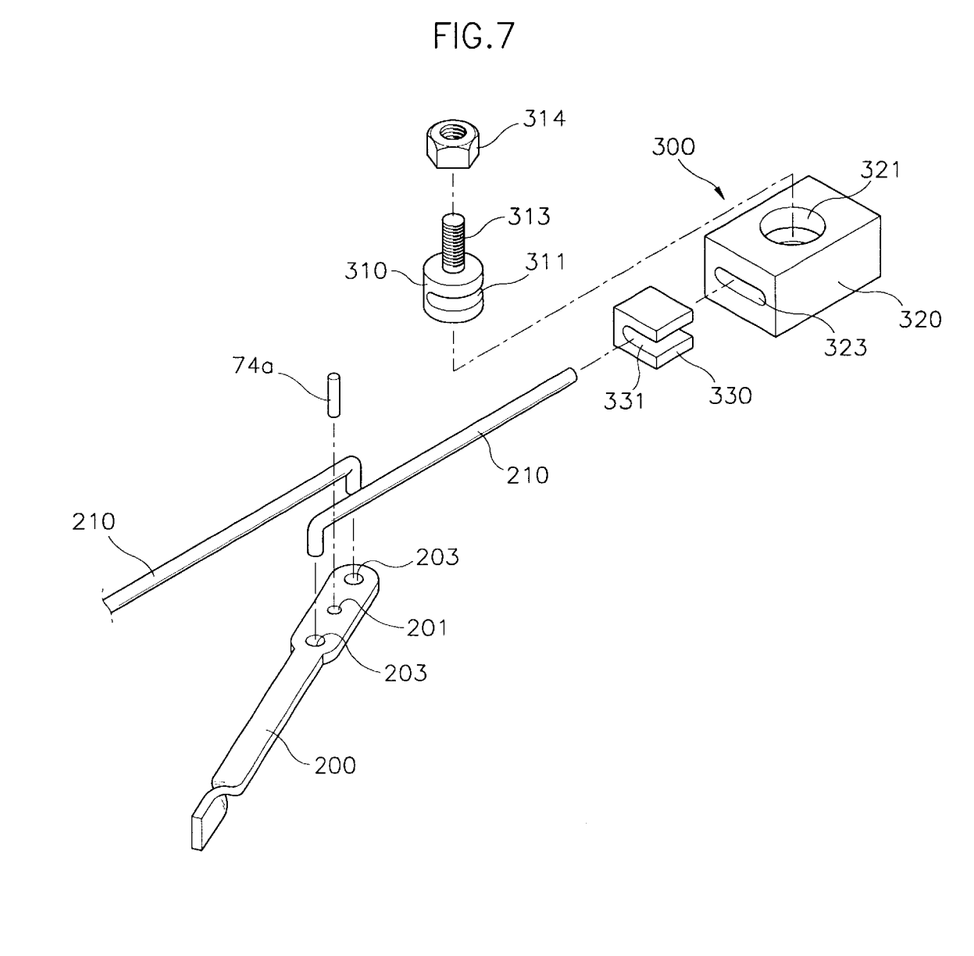
FIG. 7 is an exploded perspective view for illustrating a principal parts of a hatch coupling device according to the present invention.

Furthermore, the first bracket 74 is centrally arranged with a lever 200 having coupling holes 203 formed at a predetermined distance from a support hole 201 defined at one side thereof, where the lever 200 is rotably supported at one side thereof about the support hole 201 by a support pin 74a as shown in FIG. 7. The lever 200 is coupled at the coupling hole 203 thereof with a plurality of rods 210 for cooperating with hinged rotation of the lever 200 and for enabling to move in mutually opposite directions.

The first bracket 74 is formed at both sides thereof with intermittent support means 300 being hitchedly coupled to the first bracket 74 according to movement of the rod 210 to intermittently support the first bracket 74 and the hatch 18.

The intermittently support means 300 is further formed with a stopper 310 coupled to the hatch 18 and formed with a hitching opening 311 at an approximate central portion thereof, and a support member 320 coupled to the first bracket 74 and longitudinally formed with a fitting opening 321 into which the stopper is fitted and crosswise formed with an insertion hole 323 into which the rod 210 is fitted. The support member 320 is attached with a guide member 330 formed at one side thereof with a guide opening 331 for guiding the movement of the rod 210.

Now, operational effect of the present invention thus described will be explained.

First of all, both sides of the first bracket 74 coupled with the hinge link mechanism 36 is coupled by the support member 320, and the support pin 74a fixed to an approximate central portion of the first bracket 74 is fitted into the support hole 201 of the lever 200 to rotably support the lever 200 about an axis.

At this time, the coupling holes 203 formed at both sides of the lever 200 are respectively coupled with rods 210 so as to move in mutually opposite directions in cooperation with the rotation of the lever 200.

Successively, the hatch 18 is coupled to the stopper 310 to complete the coupling there between. At this time, when the hatch 18 and the first bracket 74 are joined, and if the hatch 18 and the first bracket 74 are pulled to let them face each other, a central line of the stopper 310 coupled to the hatch 18 and a central line of fitting hole 321 at the support member 320 coupled to the first bracket 74 are aligned to allow the stopper 310 to be fitted into the fitting hole 321.

Furthermore, the stopper 310 is so coupled to the hatch 18 that an open side of the hitching opening 311 faces a direction where the rod 210 is inserted. When the stopper 310 is completed in fitting, the lever 200 is rotated to insert the rods 210 to the insertion opening 323 of the support member 320 by utilizing the rods 210 each moving in distancing direction, such that the stopper 310 is supported to the support member 320 by the rod 210.

Meanwhile, when emergency occurs such as overturn or submergence or the like, passengers are advised to rotate the lever 200 to allow the rod 210 to withdraw from the insertion opening 323 of the support member 320. In other words, when the lever 200 is rotated in a direction opposite from that of coupling of the hatch 18, and rod 210 is slipped out of the insertion hole 323 of the support member 320, such that a support state between the stopper 310 and the support member 320 is released to allow the hatch 18 to be separated from the first bracket 74.

As a result, even during an emergency where passengers should escape from interior of a vehicle to outside thereof, the passengers can pull the lever 200 to easily separate the hatch 18 to enable to escape from the interior of the vehicle through the opening 11.

Meanwhile, as illustrated in FIG. 7, when the support member 320 is attached to the guide member 330, the rod 210 is so guided as to easily inserted into the insertion hole 323 of the support member 320.

As apparent from the foregoing, there is an advantage in the roof ventilator for closed vehicle thus described according to the present invention in that a hatch is firmly secured in order to open and close an opening at a vehicle roof for ventilation during normal times, and to easily enable to dismantle a hatch during emergency such as overturn or submergence of a vehicle, and to prevent breakage of hatch even if the hatch is frequently dismantled for maintenance thereof.

What is claimed is:

1. A vehicle hatch dismantling device, the device having a hatch sizeably formed to cover an opening at a roof, a first bracket secured underneath the hatch, a hinge link mechanism linked to the first bracket and a second bracket fixed to an inner wall surface proximate the opening, the device comprising:

a lever rotatably supported at one side thereof to a center part of the first bracket and having a coupling hole;

a rod coupled to the coupling hole of the lever;

a stopper coupled to the hatch and formed with a hitching opening at an approximate center portion thereof; and a support member coupled to the first bracket, the support member formed with a fitting hole accommodating the stopper and crosswise formed with a support opening through which a rod passes.

2. The device as defined in claim 1, wherein the support member is formed with a guide member openly formed at one side thereof with a guide opening for the rod to be guidingly moved therethrough.

3. A removable vehicle hatch system comprising:

hatch for covering an opening on a roof of the vehicle;

a first bracket;

a second bracket coupled to the roof;

a link coupling the first bracket to the second bracket;

a lever rotatably coupled to the first bracket about an axis;

a support member coupled to the first bracket and comprising a first opening and a second opening transverse to the first opening, a stopper coupled to the hatch and comprising an opening, the stopper fitted within the support member first opening; and a rod coupled to the lever and insertable into the stopper opening through the support member second opening.

4. The system of claim 3 further comprising:

a second support member coupled to the first bracket and comprising a first opening and a second opening transverse to the first opening, a second stopper coupled to the hatch and comprising an opening, the second stopper fitted within the support member first opening; and a second rod coupled to the lever and insertable into the second stopper opening through the second upport member second opening.

5. The system as recited in claim 4 wherein one of said rods is coupled to the lever away from the axis and the other rod is coupled to the lever away from the axis and opposite of said one of said rods.

* * * * *

UNITED STATES PATENT AND TRADEMARK OFFICE
CERTIFICATE OF CORRECTION

PATENT NO.    : 6,394,539 B1
DATED         : May 28, 2002
INVENTOR(S)   : Dae-Sung Park It is certified that error appears in the above-identified patent and that said Letters Patent is hereby corrected as shown below:

<u>Column 4,</u>
Line 51, replace "upport" with -- support --

Signed and Sealed this

First Day of July, 2003

JAMES E. ROGAN
*Director of the United States Patent and Trademark Office*